United States Patent [19]
Mukherjee et al.

[11] Patent Number: 4,828,437
[45] Date of Patent: May 9, 1989

[54] APPARATUS FOR SUPPORTING A WORKPIECE

[75] Inventors: Jyoti Mukherjee, North Royalton; Heniz K. Wolf, Willoughby Hills, both of Ohio

[73] Assignee: The Warner & Swasey Company, Cleveland, Ohio

[21] Appl. No.: 61,523

[22] Filed: Jun. 15, 1987

[51] Int. Cl.$^4$ .............................................. B23C 1/02
[52] U.S. Cl. ..................................... 409/231; 82/147; 82/170; 82/1.11; 269/20
[58] Field of Search ................. 82/30, 31, 1 C, 45; 409/241, 242, 231, 232, 233, 234; 269/20, 287

[56] References Cited

U.S. PATENT DOCUMENTS

| | | | |
|---|---|---|---|
| 2,614,447 | 10/1952 | Lomazzo | 82/31 |
| 2,957,393 | 10/1960 | Kampmeier . | |
| 3,034,408 | 5/1962 | Kampmeier . | |
| 3,053,127 | 9/1962 | Montanus | 82/31 |
| 3,244,028 | 4/1966 | Dever et al. . | |
| 3,516,328 | 6/1970 | Jones et al. . | |
| 3,540,346 | 11/1970 | Jones | 409/231 |
| 3,545,335 | 12/1970 | Lehmkuhl . | |
| 3,580,135 | 5/1971 | Jones . | |
| 3,869,002 | 3/1975 | Koenig | 409/231 |

Primary Examiner—Frederick R. Schmidt
Assistant Examiner—Blynn Shideler
Attorney, Agent, or Firm—Calvin G. Covell; Raymond J. Eifler

[57] ABSTRACT

A method and apparatus for rotatably supporting a workpiece WP includes a bearing ring 300 which extends around a center support member 204. The bearing ring is deflectable inwardly at a plurality of spaced apart locations 310 to engage the center support member at these locations during machining of a workpiece. At each of the locations where the bearing ring is deflected inwardly into engagement with the center support member, the bearing ring has a reduced thickness to thereby reduce the resistance of the bearing ring to deformation at these locations. Fluid pressure applied against the outside of the bearing ring deflects the bearing ring inwardly at the locations of reduced thickness. The deflected portions of the bearing ring engage the center support member to securely hold it during machining of a workpiece. When the machining of a workpiece is finished, the fluid pressure against the bearing ring is reduced and the natural resilience of the bearing ring causes it to return to its original configuration.

3 Claims, 4 Drawing Sheets

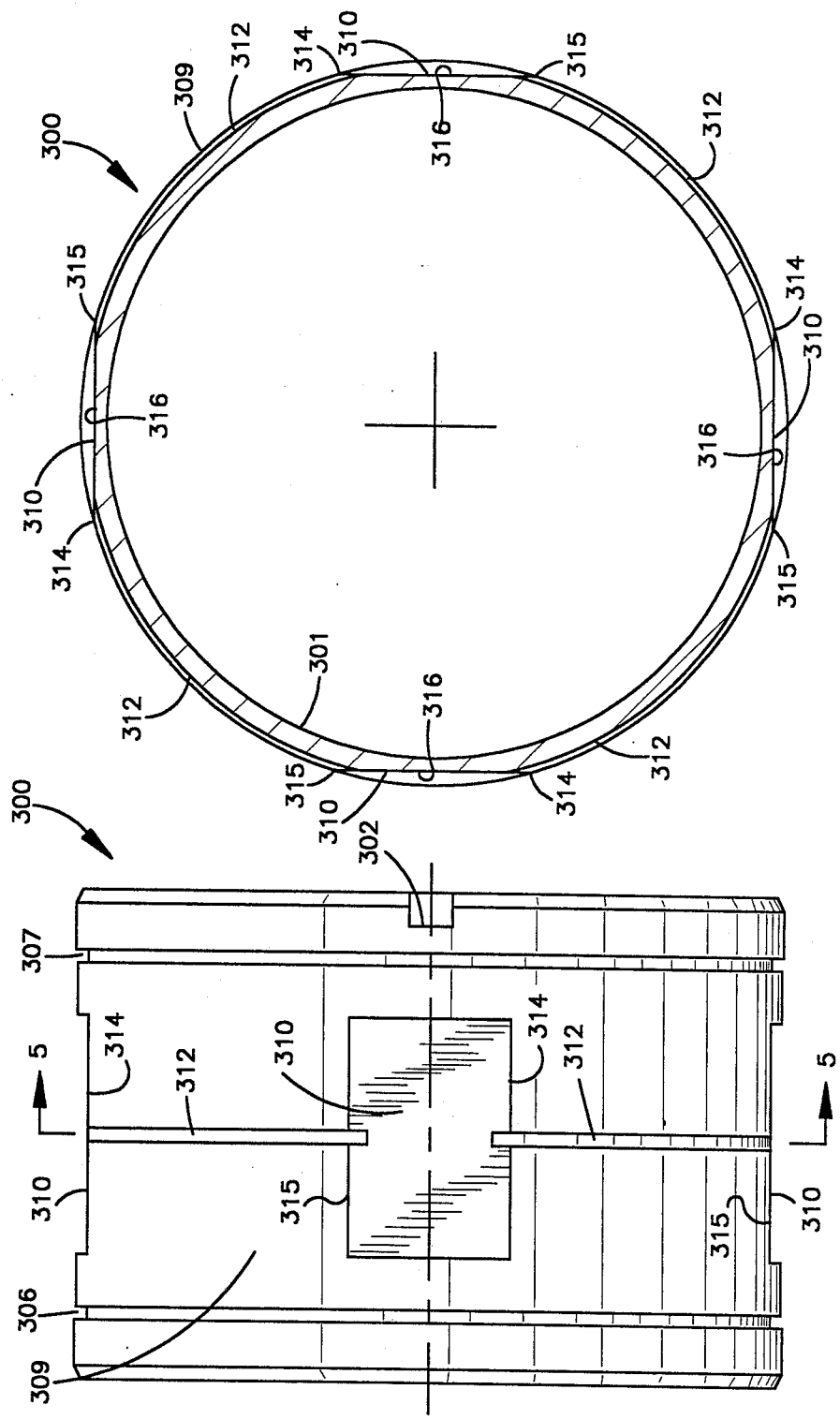

APPARATUS FOR SUPPORTING A WORKPIECE

This invention relates to an for supporting a workpiece for rotation about an axis during machining of the workpiece.

Known machine tools have a tailstock to support a workpiece during machining of the workpiece. These known tailstocks have a center which is supported by a quill or center support member. The center is movable along the axis of rotation of the workpiece by a motor connected with the quill.

A cylindrical bearing ring or bushing is provided around the quill to support the quill for axial movement. During machining of the workpiece, force is transmitted from the quill through the bearing ring to a tailstock housing or frame. A clearance space is provided between the outside of the quill and the inside of the bearing ring to accommodate axial movement of the quill relative to the bearing ring. This clearance space allows sidewise movement of the tailstock center to occur under the influence of forces transmitted from the quill to the bearing ring during machining of a workpiece. One example of a tailstock having such a construction is shown in U.S. Pat. No. 3,160,041 issued Dec. 8, 1964 and entitled Tailstock. Other known tailstocks for supporting a workpiece are disclosed in U.S. Pat. No. 2,614,447 issued Oct. 21, 1952 and entitled Tailstock and in U.S. Pat. No. 3,533,316 issued Oct. 13, 1970 and entitled Hydrostatic Precision Tailstocks.

SUMMARY OF THE INVENTION

The present invention relates to a new and improved apparatus for supporting a workpiece for rotation during machining of the workpiece. A center is provided to engage one end of the workpiece. A support member for the center is movable along the axis of rotation of the workpiece to move the center into engagement with one end of the workpiece. A bearing ring extends around the support member.

In accordance with a feature of the invention, the bearing ring is deflected inwardly at a plurality of spaced apart locations to grip the center support member during machining of the workpiece. This inward deflection of the bearing ring eliminates the clearance space between the bearing ring and the center support member. The bearing ring may be deflected inwardly by fluid pressure applied to the outer side surface of the bearing ring. Deflection of the bearing ring at selected locations is promoted by reducing the cross sectional area of the bearing ring at these locations to thereby reduce the resistance of the bearing ring to elastic deformation under the influence of fluid pressure.

DETAILED DESCRIPTION OF THE INVENTION

FIG. 4 is an enlarged elevational view of a bearing ring used in the tailstock assembly of FIG. 2;

FIG. 5 is a sectional view, taken generally along the line 5—5 of FIG. 4, further illustrating the construction of the bearing ring;

Figure 1:
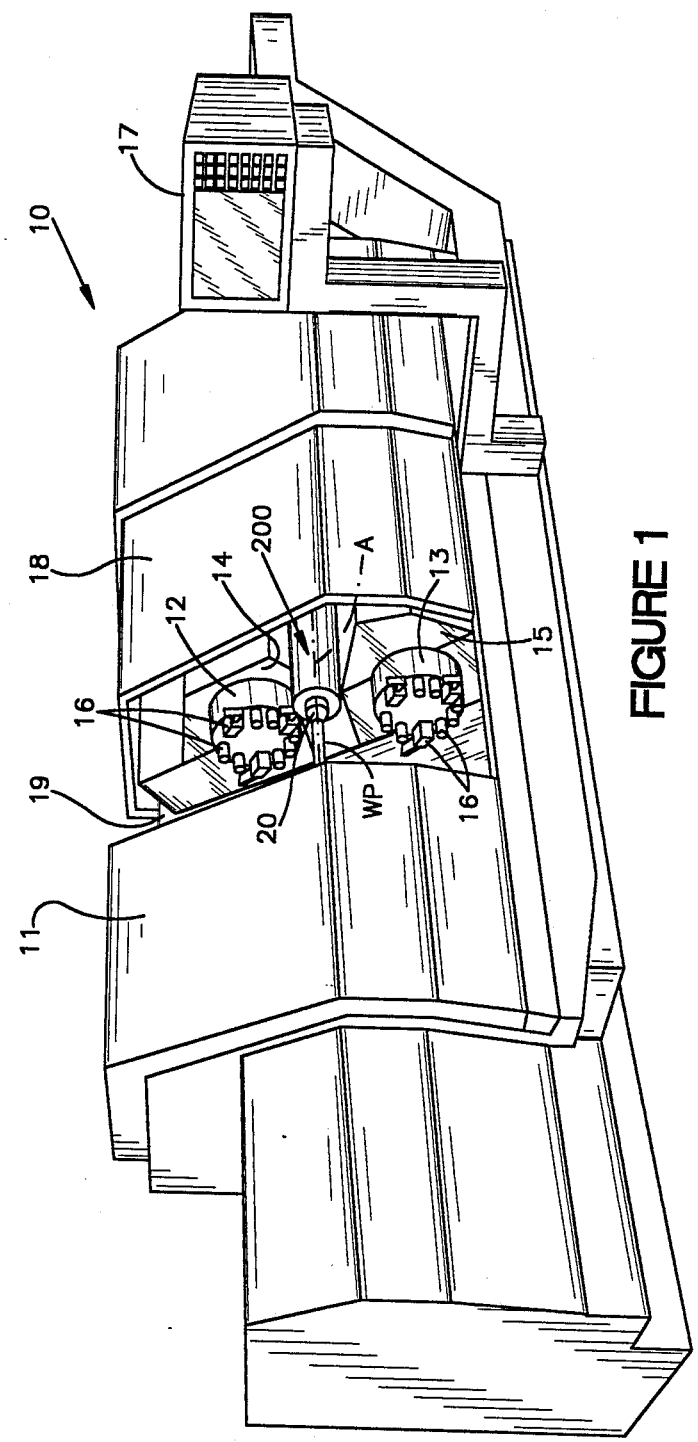
FIG. 1 is a schematic illustration of a machine tool having a tailstock assembly which supports one end of a workpiece and is constructed in accordance with the present invention.

Referring now to the drawings, a machine tool 10 is schematically illustrated in FIG. 1. The machine tool 10 has a headstock (not shown) enclosed within a housing 11. The headstock is engageable with one end of a workpiece WP to support the workpiece for rotation about a horizontal central axis A. A tailstock assembly 200 engages the opposite end of the workpiece to further support the workpiece for rotation about the axis A.

A pair of turrets 12 and 13 are rotatable about horizontal axes extending parallel to the axis A. The turrets 12 and 13 are mounted on slides 14 and 15 for movement along the axis A and for movement toward and away from the workpiece WP. The turrets 12 and 13 hold known cutting tools 16 (illustrated schematically in FIG. 1) for cutting metal from the workpiece WP during rotation of the workpiece about the axis A. Operation of the machine tool 10 is regulated by controls 17.

During operation of the machine tool 10, a slidable housing panel 18 is closed to enclose a work area in which the tools 16 cut metal from the workpiece WP. The illustrated machine tool 10 has a slant bed or base 19. The machine tool 10 is commercially available from the Warner & Swasey Company, Turning Division of 31700 Solon Road, Solon, Ohio, U.S.A., under the designation TITAN (Trademark) Slant Bed Universal. However, the machine tool 10 could have other known constructions and the present invention is not to be limited to any specific type of machine tool.

Figures 2, 3:
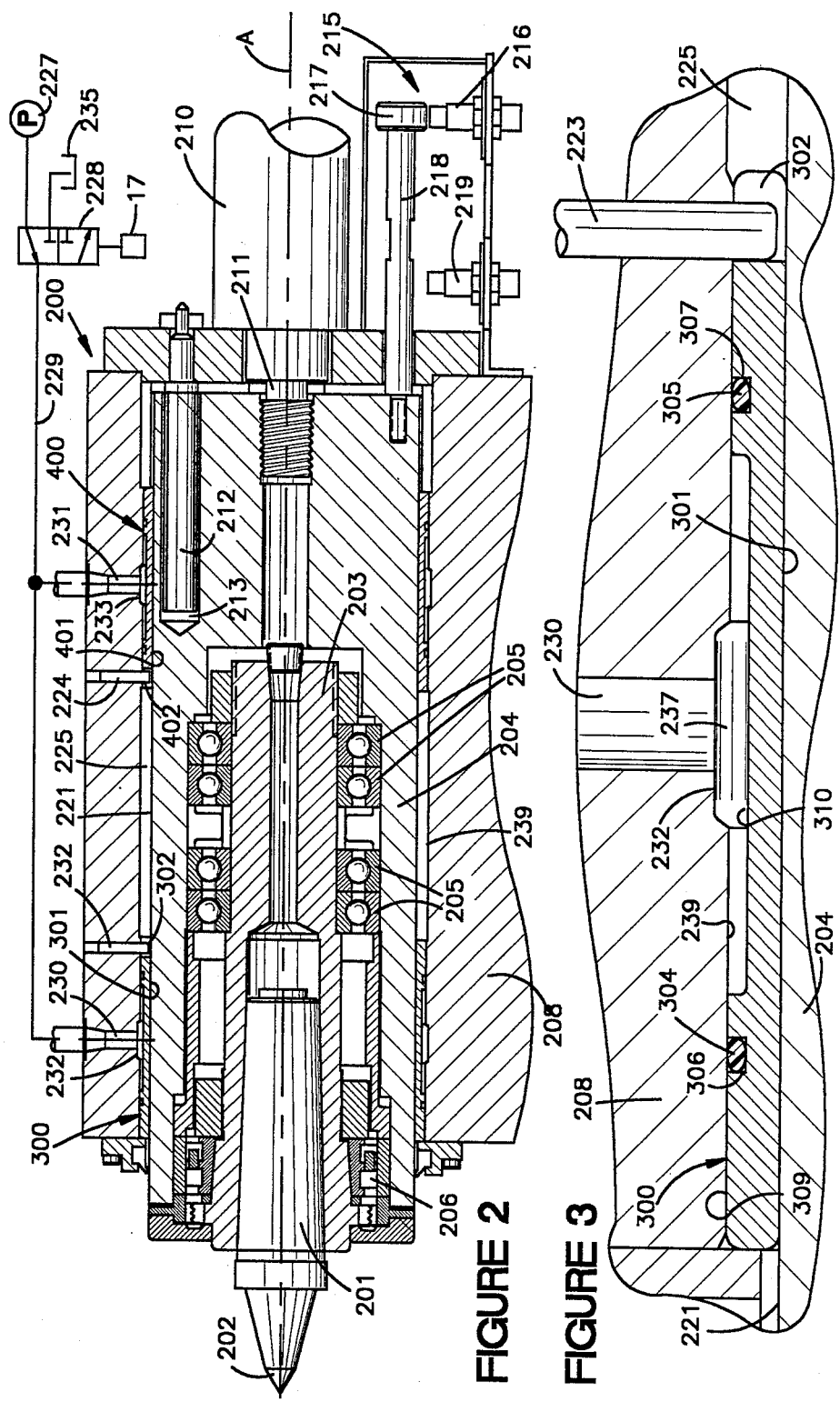
FIG. 2 is a sectional elevational view of the tailstock assembly of FIG. 1.
FIG. 3 is an enlarged fragmentary sectional view of a portion of the tailstock assembly FIG. 2 and illustrates the relationship between a bearing ring, a center support member, and a housing.

The construction of the tailstock assembly 200 is illustrated in FIG. 2. The tailstock assembly 200 includes a center 201 having a conical outer end portion 202 which engages one end of a workpiece WP to rotatably support the workpiece during operation of the machine tool 10. The center 201 is fixedly connected to a spindle 203. The center 201 and spindle 203 have central axes which are coincident with the axis A of rotation of the workpiece WP.

The spindle 203 is rotatably supported in a quill or center support member 204 by bearings 205 and 206. The bearings 205 are capable of withstanding both radial and axial load forces. The bearing 206 is primarily capable of withstanding radial load forces. The cylindrical quill or center support member 204 is mounted in a tailstock housing 208 with its central axis coincident with the axis A about which the workpiece WP is rotated by the headstock. The center support member 204 is axially movable along the slant bed 19 (FIG. 1) of the machine tool 10 to position the center 201 adjacent to one end of the workpiece WP.

A hydraulic piston and cylinder type motor 210 (FIG. 2) is connected with one end of the center support member 204. The motor 210 is operable to move the center support member 204 along the axis A toward and away from the workpiece WP. This movement of the center support member 204 by the motor 210 moves the end 202 of the center 201 into engagement with the end of the workpiece WP to rotatably support the one end of the workpiece in a known manner. The motor 210 has a piston rod 211 connected with one end of the center support member 204. A rod 212 extends from the tailstock housing 208 into an opening 213 in the center support member 204 to hold the center support member against rotation about the axis A.

A detector assembly 215 is connected with the center support member 204 and provides an output signal which indicates whether the center support member and center 201 are in the retracted position shown in FIGURE 2 or a fully extended position to the left of the position shown in FIG. 2. The detector assembly 214 includes a first proximity switch 216 which is actuated by a circular head end 217 of a rod 218 connected to the center support member 204 when the center support member is in the retracted position of FIG. 2. When the center support member 204 has been moved to the fully extended position by operation of the motor 210, the head end 217 and the rod 218 is adjacent to and causes actuation of a second proximity switch 219.

A pair of identical bearing rings 200 and 400, constructed in accordance with a feature of the present invention, support the quill or member 204 for axial movement relative to the housing 208. Thus, when the motor 210 is operated to extend the piston rod 211, the center support member 204 is moved toward the left (as viewed in FIG. 2). As this occurs, a cylindrical outer side surface 221 of the center support member 204 slides along cylindrical inner side surfaces 301 and 401 of the annular bearing rings 300 and 400. Although it is preferred to construct the center support member 204 and bearing rings 300 and 400 with circular cross sectional configurations, the center support member and bearing rings could have noncircular cross sectional configurations if desired.

If the motor 210 is operated to move the center support member 204 to a fully extended position, the head end 217 on the detector rod 218 will actuate the proximity switch 219 to cause the turning machine controls 17 (FIG. 1) to interrupt operation of the machine tool 10. However, it is contemplated that the leading or outer end 202 (FIG. 2) of the center 201 will engage the end of the workpiece WP before the center support member is moved to a ully extended position. The center 201 is moved out of engagement with the end of a workpiece WP by reversing a direction of operation of the motor to move the center support member 204 toward the right (as viewed in FIG. 2).

The bearing rings 300 and 400 have an interference fit with the housing 208 to hold them against axial movement with the center support member during operation of the motor 210. A pair of parallel pins 223 and 224 extend from a housing 208 into engagement with notches 302 and 402 formed in axial ends of the bearing rings 300 and 400. The pins 223 and 224 hold the bearing rings in a predetermined angular orientation with the housing 208.

During axial movement of the center support member 204, friction forces are transmitted between the cylindrical outer side surface 221 of the center support member and the cylindrical inner side surfaces 301 and 401 of the bearing rings 300 and 400. These friction forces are minimized by providing a lubricating liquid in an annular chamber 225 disposed between the center support member 204, housing 208 and axial ends of the bearing rings 300 and 400.

In addition to providing lubricating liquid in the chamber 225 to minimize friction forces, a clearance space of 0.0254 mm. to 0.0381 mm. is provided between the outer side surface 221 of the center support member 204 and the inner side surfaces 301 and 401 of the bearing rings 300 and 400. If a smaller clearance space is left between the outer side surface 221 of the center support member 204 and the inner side surfaces 301 and 401 of the bearing rings 300 and 400, frictional forces will tend to effectively lock up the center support member 204. The clearance space is also necessary to allow for thermal expansion of either the bearing rings 300 and 400 or the center support member 204.

If the clearance space between the outer side surface 221 of the center support member and the inner side surfaces 301 and 401 of the bearing rings 300 and 400 is not eliminated before machining of the workpiece WP begins, the center support member 204 will move relative the bearings 300 and 400 and housing 208 during machining of the workpiece WP. Thus, the center support member 204 will tend to move relative to the bearings 300 and 400 when the direction in which cutting forces are applied to the workpiece changes. The center support member 204 will also tend to move during machining of the workpiece WP if the workpiece is not balanced about the axis A.

In accordance with a feature of the invention, the bearing rings 300 and 400 (FIG. 2) are deflectable inwardly to eliminate the clearance space between the outer side surface 221 of the center support member 204 and the inner side surfaces 301 and 401 of the bearing rings 300 and 400 during machining of the workpiece WP. In the illustrated embodiment of the invention, the bearing rings 300 and 400 are elastically deflected inwardly by fluid pressure to engage the outer side surface 221 of the center support member 204. Thus, high pressure hydraulic fluid from a pump 227 is conducted through a control valve 228, conduits 229 and passages 230 and 231 formed in the housing 208 to annular pressure distribution rings 232 and 233 (FIG. 2).

The pressure distribution rings 232 and 233 are formed in the tailstock housing 208 and extend around the bearing 300 and 400. The pressure distribution rings 232 and 233 open radially inwardly toward outer side surfaces of the bearing rings 300 and 400. The fluid pressure conducted from the pump 227 to the pressure distribution rings 232 and 233 is applied against the outside of the bearing rings 300 and 400 throughout the circumference of the bearing rings. In one specific instance, the bearing rings 300 and 400 were exposed to and elastically deflected radially inwardly into engagement with the center support member 204 by a hydraulic fluid pressure of approximately 800 psi. Of course, the specific fluid pressure applied against the outside of the bearing rings 300 and 400 will depend upon the force required to deflect the bearing rings and the force to be applied against the center support member 204 to hold the center support member during machining of the workpiece.

When the center support member 204 is to be moved axially relative to the housing 208 by the motor 210, the machine tool controls 17 effect operation of the valve 228 to connect the conduit 229 in fluid communication with drain or reservoir 235. The resulting reduction in the fluid pressure in the distribution rings 232 and 233 allows the natural resilience of the bearing rings 300 and 400 to cause them to spring back to their original configuration. This results in the reestablishing of the clearance space between the bearing rings 300 and 400 and the center support member 204.

The machine tool controls 17 then effect operation of the motor 210 to move the center support member 204 to position the center 210 at a desired location along the axis A. The valve 228 is then actuated back to the position shown in FIG. 2 to again deflect the bearing rings 300 and 400 into engagement with the center support member 204. In the illustrated machine tool 10, the workpiece WP is supported by a tailstock assembly 200. However, it is contemplated that the bearing rings 300 and 400 could be used in workpiece support assemblies other than the tailstock assembly 200.

The relationship between the bearing ring 300, the center support member 204 and the housing 208 is further illustrated in FIG. 3. The annular pressure distribution ring 232 formed in the housing 208 is connected in fluid communication with the passage 230. The pressure distribution ring opens inwardly and cooperates with the bearing ring 300 and surfaces of the housing 208 to form a pressure pocket 237. The fluid pressure communicated to the pressure pocket 237 is effective to elastically deflect the bearing ring 300 inwardly against the outer side surface 221 of the center support member 204. This deflection of the bearing ring 300 occurs without plastic, that is, permanent, deformation of the bearing ring.

O-ring seals 304 and 305 are disposed in annular recesses 306 and 307 formed in the bearing ring 300. The circular O-ring seals 304 and 305 sealingly engage a cylindrical inner side surface 239 of the housing 208 at locations on axially opposite sides of the pressure distribution ring 232. The seals 304 and 305 prevent fluid leakage axially along the one piece bearing ring 300. The pin 223 extends into the notch 302 to hold the bearing ring 300 against axial movement toward the right (as viewed in FIG. 3), to locate the bearing ring 300 circumferentially relative to the center support member 204 and the housing 208 and to hold the bearing ring 300 against rotation relative to the housing 208.

The construction of the bearing ring 300 is further illustrated in FIG. 4. The one piece bearing ring 300 has a cylindrical outer side surface 309 in which a plurality of flats 310 are formed. The flats 310 reduce the thickness of the bearing ring 300 at spaced apart locations around the circumference of the bearing ring. The reduced thickness of the bearing ring 300 at the flats 310 reduces the structural stiffness of the bearing ring to enable it to be deflected radially inwardly by pressure applied against the flats 310.

The flats 310 are connected in fluid communication by arcuate segments 312 of an annular groove. The arcuate groove segments 312 are radially aligned with the pressure distribution ring 232 (FIG. 3). The groove segments 312 conduct fluid pressure around the cylindrical bearing ring 300 between the flats 310.

At locations other than the flats 310, the bearing ring 300 has sufficient structural stiffness to resist deflection under the influence of the fluid pressure forces applied against the outside of the bearing ring. Therefore, the bearing ring 300 is deflected radially inwardly into engagement with the center support member 204 only at the flats 310.

FIG. 5 illustrates the manner in which the flats 310 are arranged on the bearing ring 300 and are interconnected by the arcuate groove segments 312. The flats 310 are cut into the side of the cylindrical bearing ring 300 as chords. This results in the side wall of the bearing ring 300 having a circumferentially tapered cross sectional configuration at each of the flats 310. The cross sectional area of the bearing ring 300 is greater in a radial plane extending from the axis A through the bearing ring at a location circumferentially offset from the flats 310 than in a radial plane extending through a central portion of one of the flats.

The side wall of the bearing ring 300 tapers circumferentially from a relatively thick cross section where each of the flats 310 intersects the outer side surface 309 of the bearing ring to a relatively thin cross section at the center of a flat. Thus, the bearing ring 300 is relatively thick at axially extending edges 314 and 315 of each of the flats 310. The bearing ring 310 is relatively thin at a central portion 316 of each of the flats 310. The circumferentially tapered cross sectional configuration of the bearing ring at the flats 310 enables the bearing ring 300 to have a relatively long service life since there are no stress concentrations or corners to cause fatigue failure upon repeated deflecting of the bearing ring.

Although the one piece bearing ring 300 has four flats 310 in the embodiment of the invention illustrated in FIG. 5, it is contemplated that greater or lesser number of flats 310 could be provided if desired. Thus, the bearing ring 300 could be provided with three flats 310 or five flats 310. However, it is preferred to form the bearing ring 300 with four flats 310 at equally spaced locations about the circumference of the bearing ring.

The size of the bearing ring 300 will depend upon the size of the center support member 204 with which the bearing ring is used. However, in one specific embodiment of the bearing ring, the cylindrical outside surface 309 of the bearing ring has a diameter of approximately 150 mm. The cylindrical inside surface 301 of the bearing ring had a diameter of approximately 140 mm. Therefore, the wall of the bearing ring, at locations other than the flats and the grooves 306, 307 and 312, had a thickness of 5 mm.

In this illustrative embodiment of the bearing ring 300, the minimum thickness of the bearing ring wall at the center 316 of each of the flats 310 was approximately 4 mm. The arcuate groove segments 312 had a depth of 0.8 mm. The flats 310 had an arcuate extent of approximately 26 degrees and 32 minutes with a resulting circumferential extent or distance between parallel edges 314 and 315 of approximately 32.5 mm. This particular bearing ring 300 had an axial extent of approximately 100 mm and each of the flats 310 had an axial extent of approximately 50 mm. The specific bearing ring 300 having the foregoing dimensions was made of a cast manganese bronze (SAE 430B) to provide a relatively low coefficient of sliding friction between the bearing support member 204 and the bearing 300.

It should be understood that the foregoing dimensions and material of the bearing ring 300 have merely been set forth for purposes of clarity of description and not for purposes of limitation of the invention. Thus, it is contemplated that the bearing ring 300 could be formed with different dimensions and of different materials. It is also contemplated that the bearing ring 300 could have a cross sectional configuration other than the illustrated circular cross sectional configuration. In addition, the flats 310 could be formed with a different configuration. For example, each of the flats 310 could be formed with an arcuate configuration with a center which is either coincident with the center of the bearing ring 300 or with a center which is located outside of the bearing ring.

Figure 6:
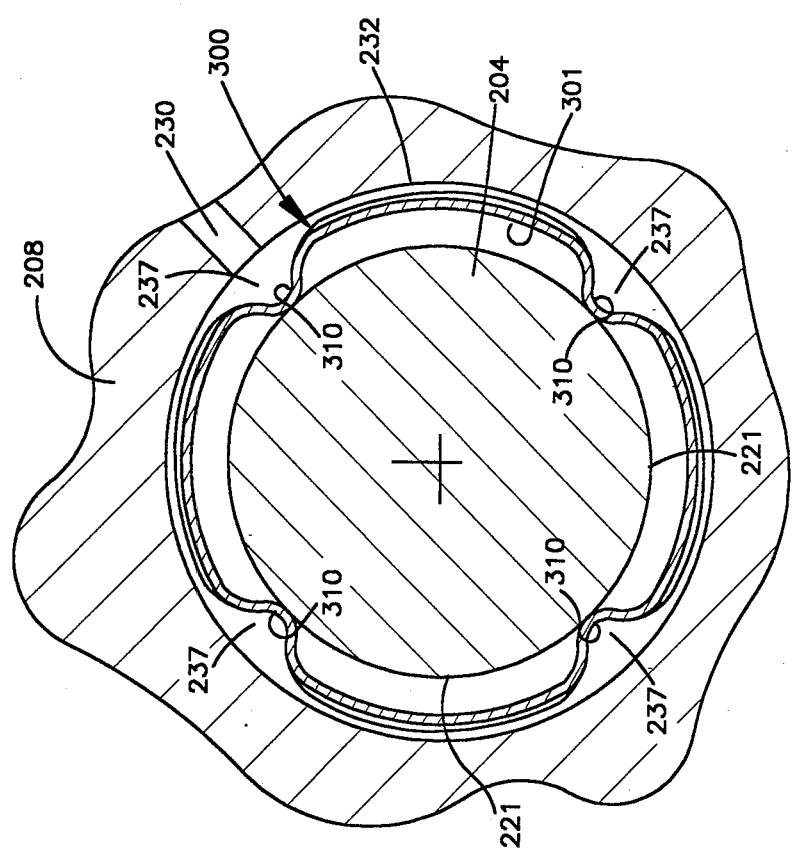
FIG. 6 is a schematic illustration depicting the relationship between the bearing ring and a center support member when the bearing ring has been deflected inwardly.

The manner in which the bearing ring 300 is deflected inwardly at a plurality of space apart locations to engage the center support member 204 during machining of a workpiece WP is illustrated schematically in FIG. 6. The fluid pressure conducted to the pressure distribution ring 232 through the passage 230 is applied against the outside of the bearing ring 300. Due to the reduced thickness of the bearing ring 300 at the flats 310 with a resulting reduced resistance to elastic deformation, the bearing ring 300 is deflected radially inwardly at the flats 310. The distance which the bearing ring 300 is deflected inwardly at each of the flats 310 corresponds to the clearance between the inner side surface 310 of the bearing ring 300 and the outer side surface 221 of the center support member 204, that is, approximately 0.03 mm.

When the flats 310 are deflected inwardly by the fluid pressure in the pockets 237 between the flats and the inner side surface 232 of the housing 208, the circumferentially tapered cross sectional configuration of the bearing ring 300 at the flats (FIG. 5) results in substantially line contact between the inside surface 301 of the bearing ring with the outside surface 221 of the center support member at each of the flats 310. The portions of the bearing ring 300 between the flats 310 remain substantially undeflected so that the clearance space remains between these portions of the bearing ring 300 and the center support member 204.

It should be understood that FIG. 6 is merely a schematic illustration of the manner in which the bearing ring 300 is deflected at the flats 310 and that the actual deflection will be substantially less than illustrated in FIG. 6. Although only the bearing ring 300 has been illustrated in FIGS. 3-6, the bearing ring 300 has the same construction as the bearing ring 400 and is deflected in the same manner as the bearing ring 300. Although it is preferred to apply fluid pressure against each of the flats 310 to deflect the bearing ring 300, it is contemplated that pressure could be applied against the flats 310 in a different manner. For example, hydraulically actuated plungers could be pressed against the flats 310 to force them inwardly.

Figure 7:
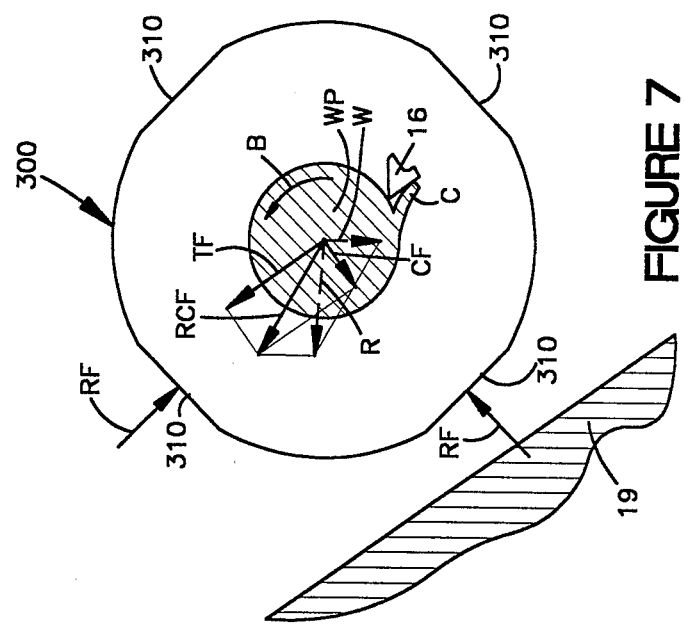
FIG. 7 is a schematic illustration depicting the forces transmitted to the bearing ring during machining of the workpiece.

FIG. 7 is a highly schematicized illustration depicting the relationship between the bearing ring 300, the workpiece WP and the slant bed 19 of the machine tool 10. The resultant of the various forces transmitted during machining of the workpiece WP is indicated schematically by the dashed arrow R in FIG. 7. The resultant machining force R is opposed by reaction forces RF at a pair of deflected flats 310 on the bearing ring 300 and a corresponding pair of deflected flats on the bearing ring 400. Since the resultant machining force R is opposed by reaction forces RF at a pair of flats on each of the bearing rings 300 and 400, the reaction forces RF are not excessively large.

During a machining operation, a tool 16 presses radially inwardly against the workpiece WP so that a tool force TF is transmitted from the workpiece WP to the center support member 204. In addition, the formation of a chip C at the cutting tool 16 results in the transmittal of a cutting force CF to the tailstock support member 204. The resultant cutting force RCF is indicated schematically in FIG. 7. In addition to the foregoing forces resulting from the use of the cutting tool 16, there is a downward force W due to the weight of the workpiece.

The resultant machining force R is directed approximately midway between the deflected flats 310 disposed on the left (as viewed in FIG. 7) half of the bearing ring 300. The reaction forces RF are disposed above and below the line of action of the resultant machining force R and are spaced apart by less than 180° about the axis of rotation A of the workpiece WP. The reaction forces RF have lines of action which intersect at the central axis A of the workpiece WP.

The foregoing analysis assumes that the workpiece WP is rotating in a counterclockwise direction, as indicated by the arrow B in FIG. 7. Of course, if the direction of rotation of the workpiece WP was reversed, the resultant force would be directed between a different pair of cutting flats 310. The illustrated cutting tool 16 is disposed on the lower turret 13 (FIG. 1). If a cutting tool on the upper turret 12 was used, the resultant force R would also be directed between a different pair of flats 310.

Regardless of which turret 12 or 13 the cutting tool 16 being used is mounted and regardless of the direction of rotation of the workpiece, the resultant force is advantageously transmitted between a pair of adjacent flats 310 to minimize the reaction forces RF which must be transmitted between the center support member 204 and the bearing ring 300 at any one of the flats. It should be understood that the specific magnitude of the resultant force R will vary depending upon the magnitude of the tool force TF, cutting force CF and the weight of the workpiece WP.

OPERATION

When a machining operation is to be undertaken on a workpiece WP with a machine tool 10, the workpiece is first mounted in a headstock chuck (not shown). The tailstock frame or housing 208 is then moved along the bed 19 in a direction parallel to the axis A until the center 201 (FIG. 2) is adjacent to one end of the workpiece WP. At this time, the valve 228 connects the conduit 229 with the drain 235 so that the bearing rings 300 and 400 are in an undeflected or relaxed initial condition.

The controls 17 then effect operation of the motor 210 to move the center support member 204 toward the left (as viewed in FIG. 2). When the leading or outer end 202 of the center 201 engages the end of the workpiece WP, operation of the motor 210 is stopped. Fluid pressure in the motor 210 holds the center 201 against the workpiece with a desired axial loading force.

In order to eliminate the clearance between the center support member 204 and the housing 208, the controls 17 move the valve 228 to the position shown in FIG. 2 connecting the conduit 229 with the pump 227. Hydraulic fluid pressure from the pump 227 is conducted to the pressure distribution rings 232 and 233. This fluid pressure is applied against the outside of the bearing rings 300 and 400. The bearing rings 300 and 400 are elastically deflected radially inwardly at a plurality of locations to securely grip the outer side surface 221 of the center support member 204.

The fluid pressure against the outside of the bearing ring 300 deflects the bearing ring inwardly at a plurality of locations, that is, at the flats 310, in the manner illustrated schematically in FIG. 6. When the bearing rings 300 and 400 have the specific dimensions and are formed of the material previously set forth herein, a fluid pressure of approximately 800 psi will deflect the bearing rings 300 and 400 and cause them to firmly grip the center support member 204. Although deflection of only the bearing ring 300 has been illustrated in FIG. 6, it should be understood that the bearing ring 400 has the same construction as the bearing ring 300 and is deflected inwardly in the same manner as the bearing ring 300.

The deflected bearing rings 300 and 400 securely grip the center support member 204 to hold the center support member against movement during machining of the workpiece WP. Thus, the resultant force R generated during machining of the workpiece WP (FIG. 7) is transmitted through the bearing rings 300 and 400 to the tailstock housing 208. The deflected bearing rings 300 and 400 hold the center support member 204 against movement during the machining operation. Therefore, a workpiece WP can be accurately machined to a desired configuration.

When the machining operation on the workpiece WP has been completed, the control 17 actuates the valve 228 to connect a conduit 229 with a drain or reservoir 235. A resulting reduction in the fluid pressure applied against the bearing rings 300 and 400 allows the natural resilience of the bearing rings to cause them to spring back to their initial configuration. This establishes clearance space between the center support member 204 and the bearing rings 300 and 400 to enable the center support member to be readily moved by the motor 210. Once the machining operations have been completed, the motor 210 will be operated to move the center support member 204 toward the right (as viewed in FIG. 2) to disengage the center 201 from the workpiece.

Having described the invention, what is claimed is:

1. An apparatus for use in supporting a workpiece for rotation about an axis during machining of the workpiece, said apparatus comprising center means (201) for engaging one end of the workpiece, said center means includes a center support member (204), means (210) for moving said center support member (204) along a path extending parallel to the axis of rotation of the workpiece, a bearing ring (300) extending around said center support member and having a cylindrical outer side surface (309), said apparatus being characterized by said bearing ring (300) including a plurality of flat outer side surface areas (310) disposed in a circular array about the circumference of said bearing ring and disposed in planes which are chords to the cylindrical outer side surface of said bearing ring, and means (227, 228, 229, 230) for applying fluid pressure against said flat outer side surface areas (310) of said bearing ring (300) to deflect bearing ring into engagement with said center support member at locations disposed inwardly of said flat outer side surface areas.

2. An apparatus as set forth in claim 1 wherein said means for applying fluid pressure against said flat outer side surface areas (310) of said bearing ring includes a source of fluid pressure (227) and means for transmitting fluid pressure (229, 230) from said source of fluid pressure to flat outer side surface areas of said bearing ring (300).

3. An apparatus as set forth in claim 1 wherein said bearing ring (300) has a radial thickness which tapers circumferentially of said bearing ring from first thicknesses at opposite edge portions of said flat outer side surface areas to a second thickness at center portions of said flat outer side surface areas, said first thickness being greater than said second thickness.

* * * * *